United States Patent [19]

Grube

[11] 4,274,295
[45] Jun. 23, 1981

[54] VARIABLE RATIO BELT DRIVE

[76] Inventor: William L. Grube, 410 Green St., Lake Bluff, Ill. 60044

[21] Appl. No.: 823,037

[22] Filed: Aug. 9, 1977

Related U.S. Application Data

[63] Continuation of Ser. No. 611,867, Sep. 10, 1975, abandoned.

[51] Int. Cl.³ .............................................. F16H 55/52
[52] U.S. Cl. ....................................... 474/23; 474/19; 474/43; 474/171
[58] Field of Search ............... 74/230.17 R, 230.17 C, 74/230.17 A, 230.17 B, 230.17 D

[56] References Cited

U.S. PATENT DOCUMENTS

| | | | |
|---|---|---|---|
| 1,031,988 | 7/1912 | Droullette | 74/230.17 D |
| 2,054,564 | 9/1936 | Quiroz | 74/230 TB |
| 2,707,883 | 5/1955 | Dodge | 74/230.17 C |
| 2,711,103 | 6/1955 | Minor | 74/230.17 C |
| 2,852,951 | 9/1958 | Minor | 74/230.17 A |
| 2,932,216 | 4/1960 | Schou | 74/230.17 A |
| 3,044,316 | 7/1962 | Forster | 74/230.17 D |
| 3,118,312 | 1/1964 | Getz et al. | 74/230.17 C |
| 3,226,995 | 1/1966 | Getz et al. | 74/230.17 C |
| 3,516,296 | 6/1970 | Detwiler | 74/230.17 |
| 3,606,799 | 9/1971 | Detwiler | 74/230.17 C |
| 3,698,497 | 10/1972 | Bombardier | 74/230.17 A |

FOREIGN PATENT DOCUMENTS

666976  7/1963  Canada ............................ 74/230.17 R

Primary Examiner—Daniel J. O'Connor
Attorney, Agent, or Firm—Dorsey L. Baker

[57] ABSTRACT

A variable ratio belt drive of the type in which each pulley has an axially movable pulley half for varying the effective drive diameter and speed ratio in a continuous, stepless manner. The drive includes a primary control assembly in one pulley having a threaded interconnection between the drive shaft and one of the pulley halves for effecting a change in the drive diameter upon application of a brake band to a collar mounting the pulley half. In one preferred embodiment, two collars and two brake bands are provided while in another, only a single band and collar is used. The other pulley is provided with a secondary control assembly which automatically responds to the primary control assembly and preferably includes cam means for precluding belt slippage.

3 Claims, 8 Drawing Figures

VARIABLE RATIO BELT DRIVE

This is a continuation, of application Ser. No. 611,867, filed Sept. 10, 1975, now abandoned.

BACKGROUND OF THE INVENTION

The continuously variable friction belt transmission offers several desirable advantages over the gear type of power transmission. A primary advantage is its apparent capability to provide stepless changes in torque and speed output ratios. Such belt transmissions are conventionally comprised of two pulleys mounted on power input and output shafts. On opposite sides of the belt, each pulley has an axially movable pulley half for varying the effective drive diameter and effecting changes in the speed and torque ratios. Such a simple concept would appear to be most desirable. Yet, because of control problems, this apparent capability is somewhat elusive. Existing control systems for belt transmissions are either complicated or lack the refinement required to achieve ratio changes without continuous maintenance and readjustment to eliminate development of belt slippage and consequent power losses. For these reasons, change speed gear drives are still preferred even in lower power applications. Thus, even multispeed bicycles continue to utilize a plurality of gears and a sophisticated derailler system.

A friction belt transmission which would overcome the prior art difficulties and receive greater acceptance would incorporate the following advantages:

1. The torque and speed ratios would be capable of positive, finite control.
2. Differential rotation of the pulley halves, inertial forces and vibration would not effect undesired changes in the torque and speed ratios.
3. Belt slippage would be essentially precluded.
4. Speed and torque ratio changes could be made with minimum force requirements.
5. The unit would be compact, minimizing the dimensions transverse to the pulleys for incorporation into environments such as bicycles.
6. The transmission would be of low cost and simple in design, minimizing maintenance, and eliminating adjustments otherwise required to maintain belt tension.
7. Friction and drag effects of the belt upon the pulley halves would be minimized.
8. The design criteria could readily be changed to achieve any desired rate of change of speed ratios.
9. The transmission would be especially suited for incorporation into a bicycle.
10. The rate of change of increasing the torque ratio can be different from the rate of change of decreasing the torque ratio.

SUMMARY OF THE INVENTION

To achieve the capabilities mentioned, the instant invention relates to a belt transmission of the type having one pulley half of each pulley mounted for axial movement to vary speed and torque ratios between an input and an output shaft. The movable pulley half incorporates the primary control assembly which includes at least one collar mounted on the shaft for relative axial and rotational motion. Upon this collar, and preferably coplanar therewith, is the axially movable pulley half also capable of rotational motion relative to the collar. These units normally rotate together upon the rotation of the associated shaft due to friction between the belt and these components. However, an annular brake band is mounted upon the collar to restrain its rotation relative to both the input shaft and the fixed pulley half. This relative rotation then effects axial displacement of the collar and the axially movable pulley half by virtue of a threaded interconnection between the input shaft and the collar, the axial movement causing a change in the effective drive diameter of the pulley.

Two embodiments of this primary control assembly are disclosed in the drawings. The preferred embodiment is provided with two collars concentrically mounted one upon the other, and includes a planetary gear train in which the outer collar has formed thereon a ring gear while the inner collar forms the sun gear. Between these units is a threaded interconnection and a planetary gear set which is constrained for rotation with the fixed pulley half. Thus, brake bands on each collar can be selectively applied to restrain rotation of one of the collars to shift the threaded interconnection and to effect axial movement of the movable pulley half, increasing or decreasing the effective drive diameter. In the other embodiment, a single collar is utilized and the input shaft is rotated in opposite directions to effect an increase or decrease in the effective drive diameter.

The secondary control assembly is mounted in the other pulley and includes a helix cam which forces the pulley halves together in proportion to the applied torque. In use, the load driven from the pulley is permitted to overrun the other pulley half to reduce its effective drive diameter and effect an increase in the speed ratio.

This structure is intended to achieve one or more of the desirable capabilities or objects previously mentioned. Further, and a primary objective is to provide a simple, maintenance free, non-slip belt transmission for a bicycle. Another object of my invention is to provide sub-assemblies for use in other friction belt drive transmissions such as motorcycles, garden tractors and electric motor drives.

DESCRIPTION OF THE DRAWINGS

The manner in which these and other objects of my invention are attained will be made clear by the following description and drawings of the preferred embodiments, in which.

DETAILED DESCRIPTION

Figure 1:
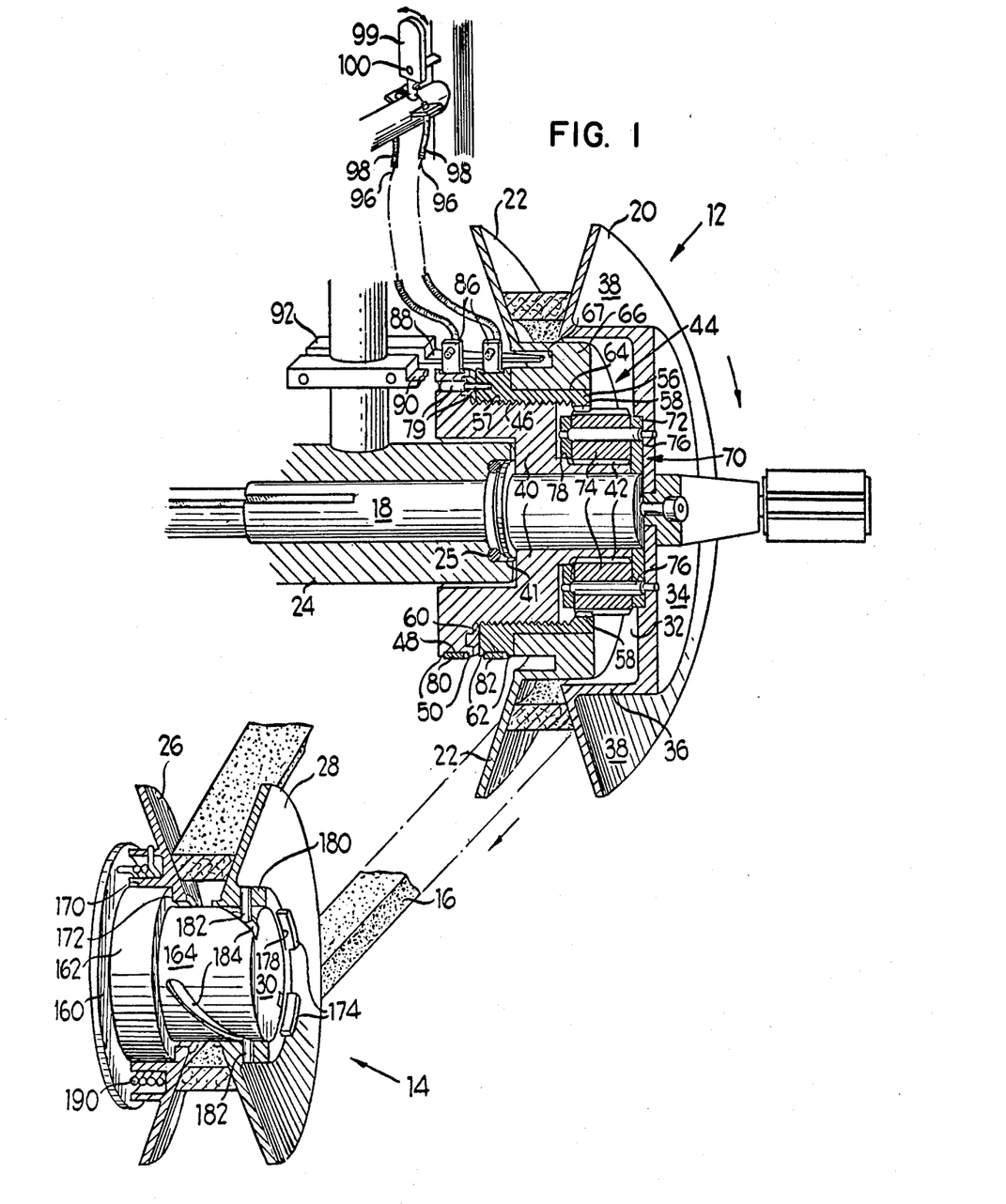
FIG. 1 is a perspective view of one preferred embodiment of the complete power transmission unit.
Figure 8:
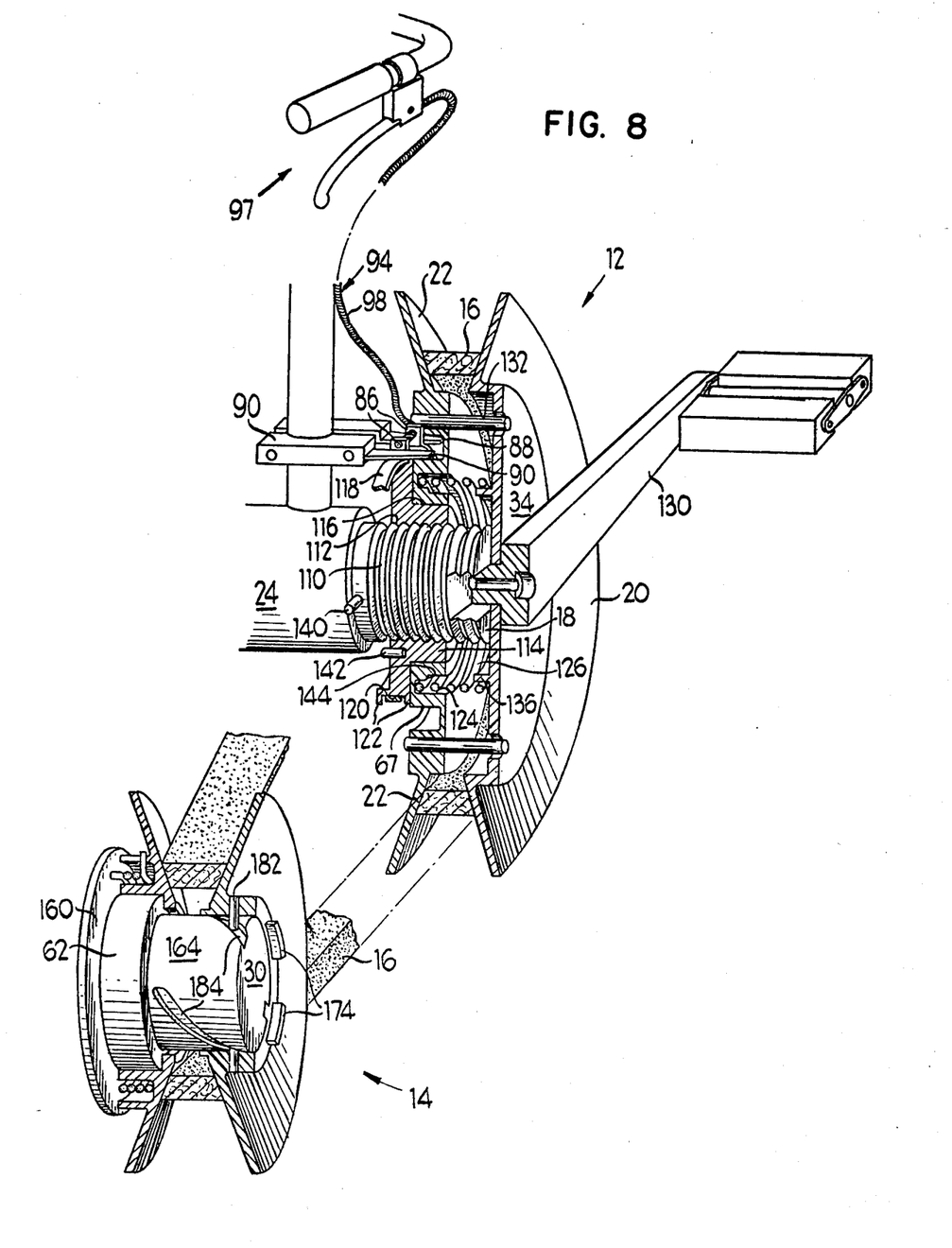
FIG. 8 is a perspective view of another preferred embodiment of my belt transmission unit.

As shown in FIGS. 1 and 8, the friction belt transmission of each of my preferred embodiments include a driving pulley 12 and a driven pulley 14 interconnected by a V-belt 16. The driving pulley 12 is mounted upon a power input shaft 18 and includes a first pulley half 20 fixed to the shaft and a second pulley half 22 mounted for axial movement as subsequently described. In one preferred environment, the input shaft 18 represents the pedal bar of a bicycle extending into and journaled by bearings 25 within the pedal shaft housing 24 of a bicycle.

As is well known, the effective drive diameter of the two pulleys of variable drive transmissions must vary in inverse proportion to one another in order to maintain the fixed length belt in taut, frictional engagement. Thus, in increasing the speed ratio of this unit, the effective drive diameter of pulley 12 must increase while that of pulley 14 decreases. Such is effected by substantially simultaneous axial movement of the movable pulley halves of the primary and secondary control assemblies to be described.

The preferred primary control assembly, as depicted in FIGS. 1–4, is capable of effecting either an increase or decrease of the drive diameter while the pulley is rotating in one direction. This result is achieved by inserting between the movable pulley half 22 and the drive shaft 18 two collar assemblies threadedly interconnected for relative rotational and axial movement. This movement is controlled by an epicyclic gear train in which either the sun or ring gear is braked to increase or decrease the threaded engagement and shifting of pulley half 22.

The specific structure which achieves these results includes the fixed pulley half 20 constrained for rotation with drive shaft 18 and having a recessed housing 32 comprised of a radial plate 34 and an inwardly extending annulus 36 which supports the belt drive flange 38. Extending within this recessed housing 32, is a first annular collar 40 mounted for relative rotation upon drive shaft 18 and fixed against axial movement to the left by an enlarged annular ring or abutment 41 of the drive shaft 18. This collar is provided with three radii - the first of which defines a sun gear 42 of an epicyclic gear train 44 subsequently described. Upon the second radius is formed a left hand screw thread 46 which effects shifting of the axially movable pulley half 22, while the third radius forms a recessed annular brake surface 48 between two shoulders 50.

Mounted upon the inner collar 40 is an outer collar 56 having a threaded internal diameter 57 engaged with threads 46, and an internal ring gear 58 which meshes with a planetary gear set subsequently described. On the external diameter of this outer collar is another annular braking surface 60 recessed between two shoulders 62 while the major portion of the external surface 64 of collar 56 mounts a hub 66 of the axially movable pulley half 22 for relative rotational movement with the collar.

The threaded engagement between the inner and outer collars 40 and 56 is shifted by a second interconnection between these elements which comprises a planetary gear set 70 having a housing 72 preferably formed of a single piece of material and appropriately cored for mounting a plurality of elongated planetary gears 74 meshing with sun gear 42 and ring gear 58. As shown in FIG. 1, the mounting pins 76 of the planetary gears extend into the radial plate 34 of the fixed pulley 20 half to constrain this carrier 72 for rotation therewith. The internal diameter of the carrier 72 adjacent pulley half 20 is reduced to extend between the end of collar 42 and the pulley half 20 to space these parts and preclude axial movement of the collar while the normal internal diameter extends beyond the sun gear 42 formed on collar 40 and is mounted upon a narrow annular surface 78 of collar 40.

During normal operation of this unit, all elements of the primary control assembly may rotate clockwise together as shown by the arrows. To effect a change in the effective drive diameter of the pulley, relative rotation of the parts is required to affect the threaded engagement between collars 40 and 56 and this is effected by restraining rotational movement of the collar mounting either the ring gear 58 or the sun gear 42. For example, if the rotation of collar 56 and ring gear 58 is restrained while the assembly continues rotating clockwise, the planetary gears 74 are caused to rotate about their axis in a counterclockwise direction which then drives the sun gear 42 and collar 40 clockwise at a speed different from that of drive shaft 18. This collar 40, being constrained against axial movement then rotates relative to restrained collar 56. Thus, there will be relative movement between threads 46 and 57 with the collar 56 and pulley half 22 being reciprocated axially to the left to decrease the effective drive diameter of the pulley 12.

The extent of this left-hand movement is limited to preclude frictional interlock between collars 40 and 56 by a safety device preferably comprising two dowel pins 79, one of which is press-fitted into an aperture in an opposite vertical face of each collar at the same radial distance from the center of rotation. Thus, as collar 56 is shifted to the left, the sides of the dowel pins will engage one another limiting further relative rotation and axial shifting so as to prevent frictional lockup between collars 40 and 56.

To increase the effective drive diameter, rotation of collar 40 and sun gear 42 is precluded, causing the planetary gears 74 and ring gear 58 and collar 56 to rotate clockwise relative to sun gear 42 and collar 50. This relative movement between threads 46 and 57 causes collar 56 and pulley half 22 to move axially to the right, increasing the relative drive of pulley 12.

During axial movement of collar 56, it should be noted that the ring gear 58 is sliding along the planetary gears 74. Further, the enlarged diameter of outer collar 56 defining the braking surface abuts the hub 66 of pulley half 22 to effect its displacement to the right. Leftward displacement of pulley half 22 upon leftward movement of outer collar 56 is caused by the horizontal force component of belt 16.

In the design of this embodiment, the rate of change of the effective drive diameter is a function of five design criteria, e.g., the gear ratio of the epicyclic gear train, the pitch of the threaded interconnection 46 and 57, the angle of the pulley face, the maximum change desired and the rotational speed of the unit. If utilized in a bicycle, the rate of change from the minimum to maximum torque ratio might require five revolutions of the pedal, while decreasing the drive diameter from maximum to minimum might require only two revolutions. Such a design alternative is most desirable in belt transmissions in that the rate of increase in drive diameter is limited by the compressibility of the belt and the rate of increase must be slower as the magnitude of the load increases.

The braking action of the appropriate collar 40 or 56 required to shift pulley half 22 is preferably accomplished by annular braking bands 80 and 82 which are formed of spring steel and loosely surrounded braking surfaces 48 and 60. Each end of each bands terminates in an upstanding tab 86 extending upward between two projections 88 and 90 which engage the exterior surfaces of the tabs and pre-tension the bands. These projections are carried by a support or clamp 92 affixed to the frame of a bicycle and extend into an annular recess 67 formed in hub 66 of pulley half 22. Preferably, each band is actuated by a standard bicycle brake cable 94 of which the inner and outer cables 96 and 98 are, respectively, attached to one of the two tabs 86 of the band.

The opposite end of each inner cable 96 may then be attached by a one-way connection to the bottom portion of a bi-directional hand lever 99 rotatable about pivot point 100. Upon rotation of lever 99 in one direction, one cable 96 is retracted, drawing tab 86 of one band (80 or 82) toward the adjacent tab of that band causing the adjacent tab to engage projection 88 which applies a reaction force R (See FIG. 4) to effect tightening of the band about the braking surface (48 or 60) effecting a change in the effective drive diameter. Rotation of lever 99 in the opposite direction will effect the opposite change in the drive diameter.

With this arrangement, positive control of the speed ratio is obtained. Continued rotation of input shaft 18 and simultaneous application of one brake band of one collar will result in a change in the drive diameter, because the other collar is forced to rotate relative thereto by reason of its interconnection with the planetary gear set 70. Such must effect the threaded engagement between collars 40 and 56. Another important concept of my invention is the force multiplication of applied braking force and the assembly of this unit. First, the tangential braking force applied to the braking surfaces 48 and 60 of collars 40 and 56 by the brake bands is an expoential function of the force applied to the inner cable 96. Thus a small force (F) applied to cable 96 may result in tangential braking force typically ten times F, and such does not include the mechanical leverage obtained from the hand lever 99. Secondly, the assembly is compact in that transverse dimension of both bands does not extend substantially beyond the axial pulley. Alternatively, other brake systems such as magnetic and hydraulic brakes may be used to limit rotation of collars 40 and 56.

Figure 2:
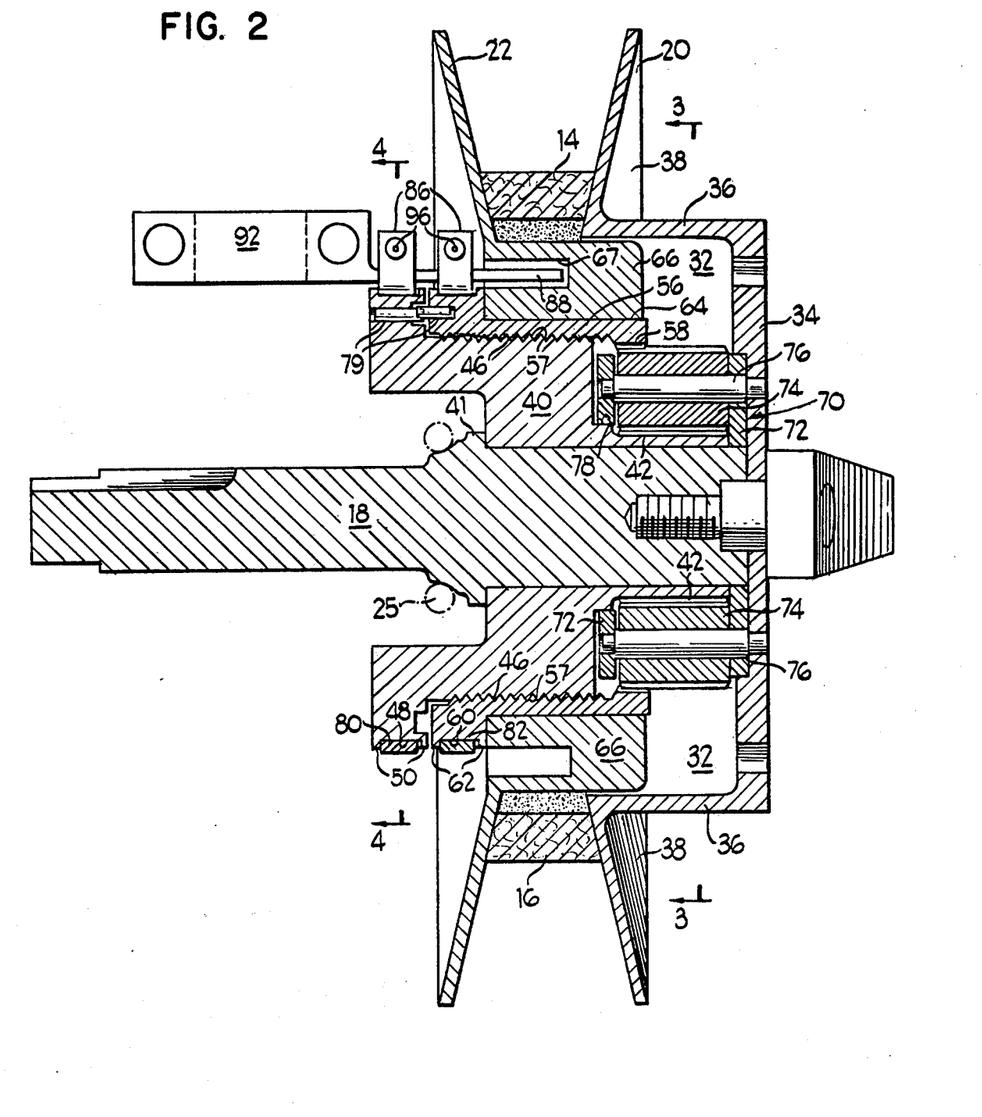
FIG. 2 is a plan view of the primary control system of the embodiment of FIG. 1 taken through its center line.
Figure 3:
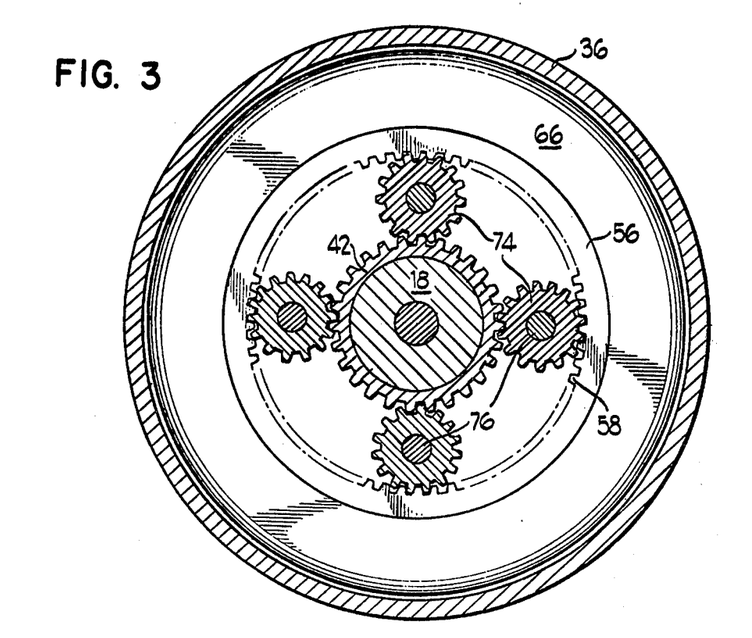
FIG. 3 is an elevational view of the primary control system taken along the line 3—3 of FIG. 2.
Figure 4:
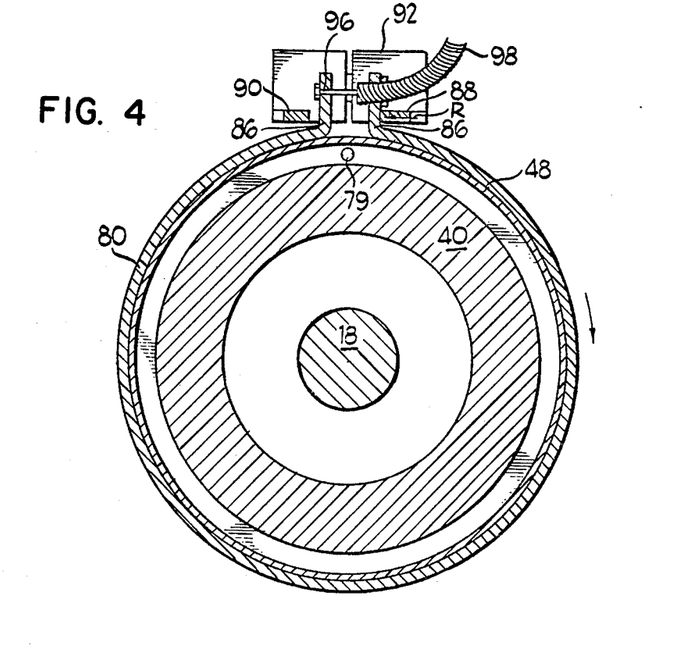
FIG. 4 is an elevational view taken along the lines 4—4 of FIG. 2.

As shown in FIGS. 1 and 2, the pulley half 22 is positioned for minimum drive diameter of pulley 12. In this position, the projections 88 and 90 extend into the recess 67 of hub 66. However, upon reciprocation of pulley half 22 to its maximum drive diameter, the outer collar 56 and brake band 60 reciprocate to the right, the recess 67 exposing more of projections 88. Simultaneously, the ring gear 58 moves transversely to the right along the gear teeth of the planetary gears 64.

Thus, the embodiment of FIGS. 1-4 includes a control pulley assembly in which the control components are substantially co-planar with the pulley drive. Further, by the application of low force to the selected brake cable, the effective drive diameter of the pulley can be increased or decreased with continued rotation of the assembly in one direction. Too, the rate of change of the speed ratios can be altered by the pitch of threads 46 and 57, the gear ratios of the epicyclic gear train or the angle of the pulley flange to achieve the rate desired for each application. Although the primary control system has been disclosed in association with the driving pulley, either embodiment might be incorporated into the driven assembly.

One alternative embodiment for the primary control system is shown in FIG. 8 as a bicycle drive using, to the extent applicable, the same reference numbers applied to the first embodiment. Similar to the device of FIGS. 1-4, this embodiment has a fixed pulley half 20 mounted on input shaft 18 and carrying a second pulley half 22 mounted for axial movement. This second pulley half is mounted upon a single collar 114 having a brake band 118. Omitted from this embodiment is the epicyclic gear train which effects an increase or decrease in drive diameter upon rotation of the unit in a single direction. As subsequently explained, the axial movement of the pulley half in one direction will therefore require a reversal of the direction of rotation of the input shaft. Here the driving shaft 18 is journaled into the bicycle housing 24 and includes a left-hand thread 110, preferably of a high pitch, which is engaged by an internal thread 112 of collar 114. This collar then mounts the movable pulley half 22 on a first external circumference 116 and a brake band 118 upon an annular braking surface 120 formed between two shoulders 122. As with the first embodiment, this braking band includes upstanding tabs 86 at its ends, the tabs being inserted between projections 88 and 90 of a support or clamp 92 mounted upon the bicycle frame. Similar to the first embodiment, a single conventional bicycle hand brake cable 94 has its inner cable 96 attached between an operating lever 97 and projections 86. Again, the purpose of the brake band 118 is to retard rotation of the collar 114 and impart relative rotational and axial movement to collar 114. Preferably, pulley half 22 is again provided with a recess 67 to receive brake reaction projections 88 and 90 and is additionally provided with a second recess 124 on its opposite surface to receive a biasing spring 126 for purposes subsequently explained.

The fixed pulley half 20 is constrained for rotation on the end of the input shaft 18 and fixed against axial displacement by encapsulating its radial plate 34 between the shaft and pedal bar 130 in the manner shown or by welding. If desired, the pulley halves of both embodiments may be mounted for rotation together by dowel pins 132. Further, the plate 34 is provided with an angular flange 136 on its inner side for locating spring bias 126.

In changing the effective drive diameter of this control assembly, the brake band 118 is applied while the pulley 12 is rotating. If this rotation is in the forward or clockwise direction, as viewed in FIG. 8, relative rotation between collar 114 and input shaft 18 causes the collar to move axially to the right, increasing the effective drive diameter. Alternatively, if the drive diameter is to be decreased, the brake is similarly applied, but the pedals are rotated in the counterclockwise direction. The relative movement between the threads of drive shaft 18 and collar 114 in this direction causes the collar to shift to the left decreasing the effective drive diameter.

As with the prior embodiment, the pulley half 22 rotates with pulley half 20 but relative to collar 114. When increasing the drive diameter, the enlarged diameter of collar 114 carrying brake surface 120 applies axial force to move pulley half 22 to the right. In decreasing the diameter, the horizontal force component of the taut belt 16 and a spring 138 extending between recess 124 and radial plate 34 urges the pulley half to the left. The spring 138 also increases the friction between pulley half 22 and collar 114 to further preclude inadvertent relative rotation of collar 114 due to the drag of brake band 118 or inertial forces.

To avoid excessive threaded engagement of the threaded interconnection 110–112, a dowel pin 140 is inserted in the input shaft 18 while another pin 142 is inserted in collar 114 in the manner shown. Since these pins are at right angles, they preclude (upon engagement) further relative rotation and threaded engagement between collar 114 and input shaft 18. Similarly, to preclude excessive unthreading of these parts, the projection 136 which mounts spring 138 will engage a shoulder 144 within recess 124.

As with the first embodiment, the control assembly is substantially co-planar with the pulley unit 12 and requires minimum extension outwardly thereof. Too, the pitch of the threads can be designed to achieve any desired rate of change of drive diameter of pulley 12.

When the drive diameter of the driving pulley 12 is changed, it is obvious that the drive diameter of the driven pulley 14 must simultaneously change in inverse proportion to maintain the fixed length belt in taut frictional driving contact. Some driven pulleys which accomplish this purpose are shown in U.S. Pat. Nos. 3,733,918 and 3,516,246 and essentially comprise an axially movable pulley having a spring bias to permit axial movement and change in effective drive diameter as required by the driving pulley.

In the instant embodiment, the driven pulley also includes a helix shaped cam means to positively preclude belt slippage except under the most extreme conditions. Moreover, this is accomplished without imposing excessive clamping forces upon the belt which would otherwise increase friction losses and the drag effect. Instead, the clamping force applied to the belt by the driven pulley is proportional to the torque applied to the input pulley.

Figure 5:
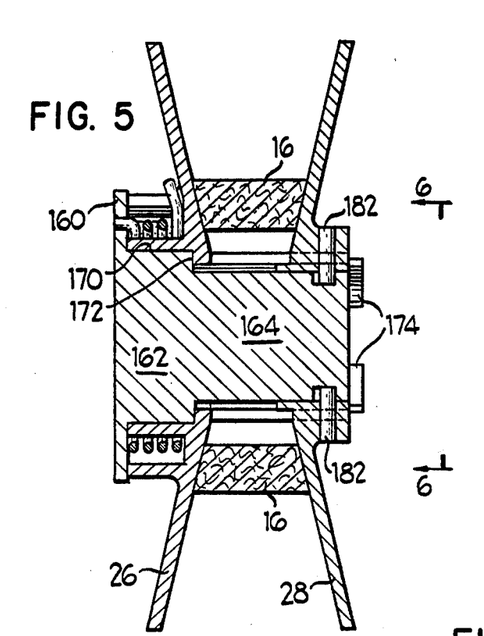
FIG. 5 is a plan view of the secondary control assembly taken through its center line.
Figure 6:
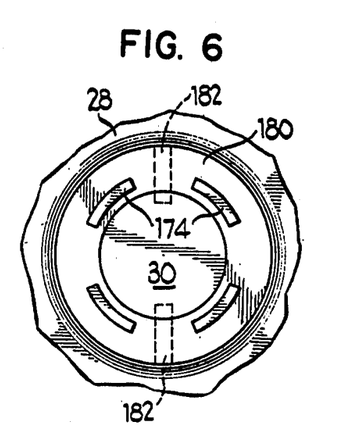
FIG. 6 is a side elevational view of the secondary control assembly with portions broken away.
Figure 7:
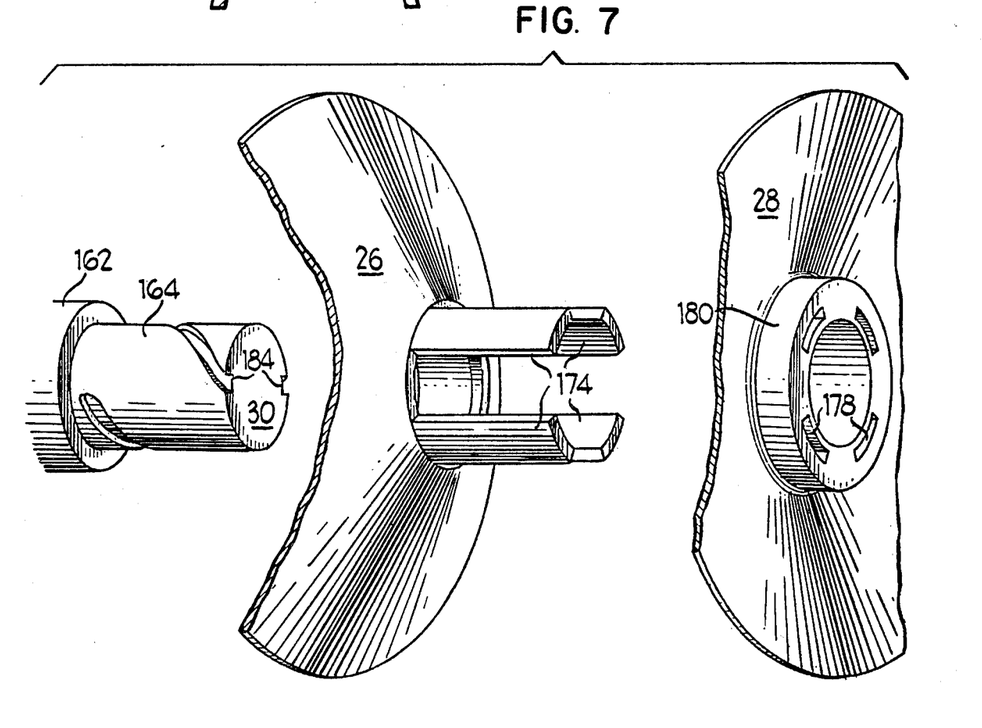
FIG. 7 is an exploded perspective view of the secondary control unit.

To accomplish this result, the driven assembly 14 includes a hub or output shaft 30 which may be constrained for rotation with the bicycle wheel or other load. Thus hub 30 includes a radially extending flange 160 joined to an annular friction surface 162 of a reduced diameter from which extends the driving projection 164. Journaled upon this hub 30 are the two pulley halves 26 and 28 preferably constrained for simultaneous rotation but capable of axial movement relative to each other. A preferred construction of pulley half 26 includes a first diameter 170 mounted upon annular surface 162, a vertical face 172 engaging a vertical surface of hub 30 and terminating in horizontal projections 174 (see FIG. 7) which extend through apertures 178 in a hub 180 of pulley 28. Interconnecting the hub 180 of pulley 28 to the output hub 30 are two pins 182 extending into two helical grooves 184 which act as a cam urging the pulley half 28 to the left to increase the effective drive diameter. Thus, if force is applied to the belt 16 in the clockwise direction, the belt's friction force tangentially engaging pulley halves 26 and 28 drives the pulley in this direction. This drive force is divided into a horizontal component by the helix groove 184 and pins 182 urging the pulley half 28 to the left into tighter frictional engagement with the belt, the other component providing rotational driving force to hub 30. Thus, the smallest frictional force applied by the belt 16 to either of the pulley halves 26, 28 during rotation will apply a horizontal force component to the pins 182. This component then forces pulley half 28 to the left, increasing the normal force applied to the sides of belt 16—thus increasing the frictional engagement and precluding belt slippage. Preferably, the grooves 184 have a pitch of approximately 20° to 40° to provide a rapid horizontal response to pulley half 28 and simultaneously eliminate slippage of belt 16 under the most extreme conditions. In addition to the angle of the pulley faces, two primary criteria are used to select the pitch angle of the grooves 184, e.g., the angle formed between a plane perpendicular to the axis of the hub 30 and the groove. First, this pitch angle must be small enough to obtain sufficient horizontal or compression force by pulley halves 26 and 28 to eliminate belt slippage. Yet, if this angle is too small, undesired drive lag may result in that substantial motion is required to axially move the pulley halves into locked driving relation with the belt. A pitch angle of less than 40 degrees is sufficient to avoid slippage under most conditions while an angle greater than 20 degrees is desirable in minimizing drive lag times. As a substitute for pins 182 and groove 184, a four or six lead screw thread having the same pitch may be preferred.

With this construction, the application of rotational force will always tend to increase the effective drive diameter of pulley 14, keeping the belt 16 taut and precluding slippage. To increase the torque output and reduce the speed ratio of this transmission, the primary control assembly must reduce the drive diameter of pulley 12, and the effective diameter of the driven pulley will automatically increase. Thus, with reference to the embodiment of FIGS. 1–4, the application of brake band 82 will move pulley half 22 to the left reducing its effective drive diameter and increasing the drive diameter of pulley half 14 through friction force of belt 16 acting on cam pins 182. The speed ratio of the embodiment of FIG. 8 is reduced by continued pedaling of the cycle while applying the single brake band 118. When the second embodiment of the primary control system is used in a bicycle, the torque can thus be increased by continued pedaling in the forward or conventional direction, and such appears necessary when the rider is approaching an incline.

To reduce the torque output ratio and increase the speed ratio, the drive diameter of the secondary control assembly must decrease. To permit the pulley half 28 to axially move to the right, it is necessary to remove driving force from the belt 16 and eliminate the horizontal component acting on the helix grooves 184. With the embodiment of FIGS. 1–4, this is accomplished by applying brake band 80 permitting the pulley 14 to overrun—a condition of coasting. Belt 16 then has a reduced speed relative to the pulley 14 causing the cam pins 182 to rotate backward relative to grooves 184 thus moving pulley half 28 to the right. The same result is achieved in the embodiment of FIGS. 6 and 7 by momentarily pedaling the cycle counterclockwise.

To prevent the halves of driven pulley 14 from separating too far or to preclude excess slack in the system, a biasing means is interposed between the flange 160 and pulley half 26. As shown in the drawings, this biasing means comprises a torsional spring 190 wound and preloaded in a clockwise direction about the flange 171 of pulley half 26 with its ends bent and locked in apertures.

When either embodiment of the primary control system is used in conjunction with the disclosed driven pulley, the rate of change of the drive diameter of the latter (determined by the angles of the cam means 182, 184 and pulley face) should be equal to or preferably greater than that of the former. Such will minimize the potential lag in removing slack upon the application of force and also permit the driven pulley to open faster when its drive diameter is increased.

As previously indicated, a preferred application of my invention is to a bicycle. Numerous other applications exist. Further, each of the embodiments of the primary control system or the secondary control system can be utilized as a sub-assembly in combination with other belt drive components. Such further utilization may require reversal or modification of the specific design parameters set forth including, but not limited to, direction of drive, thread pitch and direction and the speed ratios of the pulleys as well as the gear train, and other changes previously suggested.

I claim:

1. A variable drive split pulley assembly comprising:
   (a) a drive shaft;
   (b) a first pulley half mounted on said drive shaft and constrained against relative rotational and axial motion;
   (c) a first collar means mounted on said shaft adjacent said first pulley half for relative rotational motion relative to said first pulley half;
   (d) a second collar means threadedly mounted on said first collar means for relative rotational and axial motion relative to said first collar means;
   (e) an epicyclic gear train interconnecting said first and second collar means;
   (f) a second pulley half concentrically mounted on said second collar means for axial motion therewith; and
   (g) brake means mounted about at least one said collar means for effecting axial movement of said second collar means and said second pulley half relative to said first pulley half for varying the effective drive diameter of said pulley assembly.

2. A variable speed belt drive mechanism comprising:
   (a) an input drive shaft;
   (b) two pulley halves mounted upon said drive shaft for receiving rotational power from said input shaft and transmitting same to a flexible drive member;
   (c) annular control means mounted concentrically upon said drive shaft and extending radially therefrom for journaling one of said pulley halves for rotation with said other pulley half and for effecting axial movement of said pulley half; and
   (d) said control means including a first and second collar operatively connected to a gear, brake means mounted on one of said collars to effect relative rotation of said gear and at least one of said collars relative to said input drive shaft, said control means including a threaded connection for effecting axial movement of said pulley half upon actuation of said brake means.

3. An apparatus as recited in claim 2 in which said brake means includes a brake band extending about an annular surface of said collar.

* * * * *